(12) United States Patent
Chopra et al.

(10) Patent No.: US 8,109,812 B2
(45) Date of Patent: Feb. 7, 2012

(54) MOTOR VEHICLE INSTRUMENT PANEL ASSEMBLY HAVING A CONDUIT WITH A GASKET SUPPORT LIP

(75) Inventors: Vikram Chopra, Canton, MI (US); Chae Hon An, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1030 days.

(21) Appl. No.: 11/957,092

(22) Filed: Dec. 14, 2007

(65) Prior Publication Data

US 2009/0156113 A1 Jun. 18, 2009

(51) Int. Cl.
*B60H 1/28* (2006.01)

(52) U.S. Cl. ........ 454/121; 454/127; 454/143; 454/152; 454/155

(58) Field of Classification Search .......... 454/119, 454/120, 121, 124, 127, 143, 148, 69, 162, 454/152; 285/314, 363, 408, 374, 189, 213, 285/139.2, 141.1, 204, 211, 212; 277/602, 277/608

See application file for complete search history.

(56) References Cited

U.S. PATENT DOCUMENTS

| | | | | |
|---|---|---|---|---|
| 2,427,431 | A | * | 9/1947 | Wieland .................. 277/608 |
| 3,198,572 | A | | 8/1965 | Stolarczyk |
| 3,218,193 | A | | 11/1965 | Isaacson |
| 3,724,357 | A | * | 4/1973 | Kavthekar et al. ........... 454/152 |
| 4,229,036 | A | | 10/1980 | Toda et al. |
| 4,459,901 | A | | 7/1984 | Watanaby et al. |
| 4,610,196 | A | * | 9/1986 | Kern .......................... 454/127 |
| 4,637,298 | A | * | 1/1987 | Yoshikawa et al. ........... 454/127 |
| 4,693,416 | A | | 9/1987 | Hayakawa et al. |
| 4,715,512 | A | | 12/1987 | Buchser |
| 5,074,610 | A | | 12/1991 | Tamura et al. |
| 5,113,748 | A | | 5/1992 | Shibuya et al. |
| 5,367,993 | A | * | 11/1994 | Tulach et al. ............... 123/90.38 |
| 6,123,616 | A | | 9/2000 | Otsuka et al. |
| 6,135,542 | A | | 10/2000 | Emmelmann et al. |
| 6,135,874 | A | | 10/2000 | Weber et al. |
| 6,273,495 | B1 | | 8/2001 | Haba et al. |
| 6,454,316 | B1 | * | 9/2002 | Aaron, III .................. 285/379 |
| 6,582,000 | B1 | | 6/2003 | Siler et al. |
| 6,616,523 | B1 | | 9/2003 | Tani et al. |

(Continued)

FOREIGN PATENT DOCUMENTS

JP 58-136567 8/1983

(Continued)

*Primary Examiner* — Steven B McAllister
*Assistant Examiner* — Jamil Decker
(74) *Attorney, Agent, or Firm* — Gifford, Krass, Sprinkle, Anderson & Citkowski, P.C.

(57) ABSTRACT

An instrument panel assembly for a motor vehicle includes a panel member, a first conduit, a second conduit and a gasket disposed between the first and second conduit. The panel member has a vent for directing air toward a window in the vehicle. The first conduit has a first end that provides air to the vent and a second end with a peripheral wall forming an inlet. The second conduit has an outlet that provides air to the inlet and a flange that extends outwardly from the outlet and includes a support surface that supports a gasket for sealing an interface between the outlet and the inlet. The second conduit has a lip that extends outwardly from the support surface of the flange and supports the gasket to prevent deformation of the gasket during assembly of the first conduit and second conduit.

15 Claims, 3 Drawing Sheets

U.S. PATENT DOCUMENTS

| | | |
|---|---|---|
| 6,802,559 B2 | 10/2004 | Yoshihara et al. |
| 6,929,312 B2 | 8/2005 | Rich et al. |
| 7,237,834 B2 | 7/2007 | Czinki et al. |
| 7,247,088 B2 | 7/2007 | Sogame et al. |
| 7,913,746 B2 * | 3/2011 | Hirooka et al. ................. 165/42 |
| 2007/0267868 A1 * | 11/2007 | Holzheu ....................... 285/368 |
| 2008/0217963 A1 * | 9/2008 | Brunard ....................... 296/208 |

FOREIGN PATENT DOCUMENTS

| | | |
|---|---|---|
| JP | 60197423 | 10/1985 |
| JP | 2001097189 | 4/2001 |
| JP | 2005096610 | 4/2005 |
| JP | 2005186811 | 7/2005 |
| KP | 10-0645155 | 11/2006 |

* cited by examiner

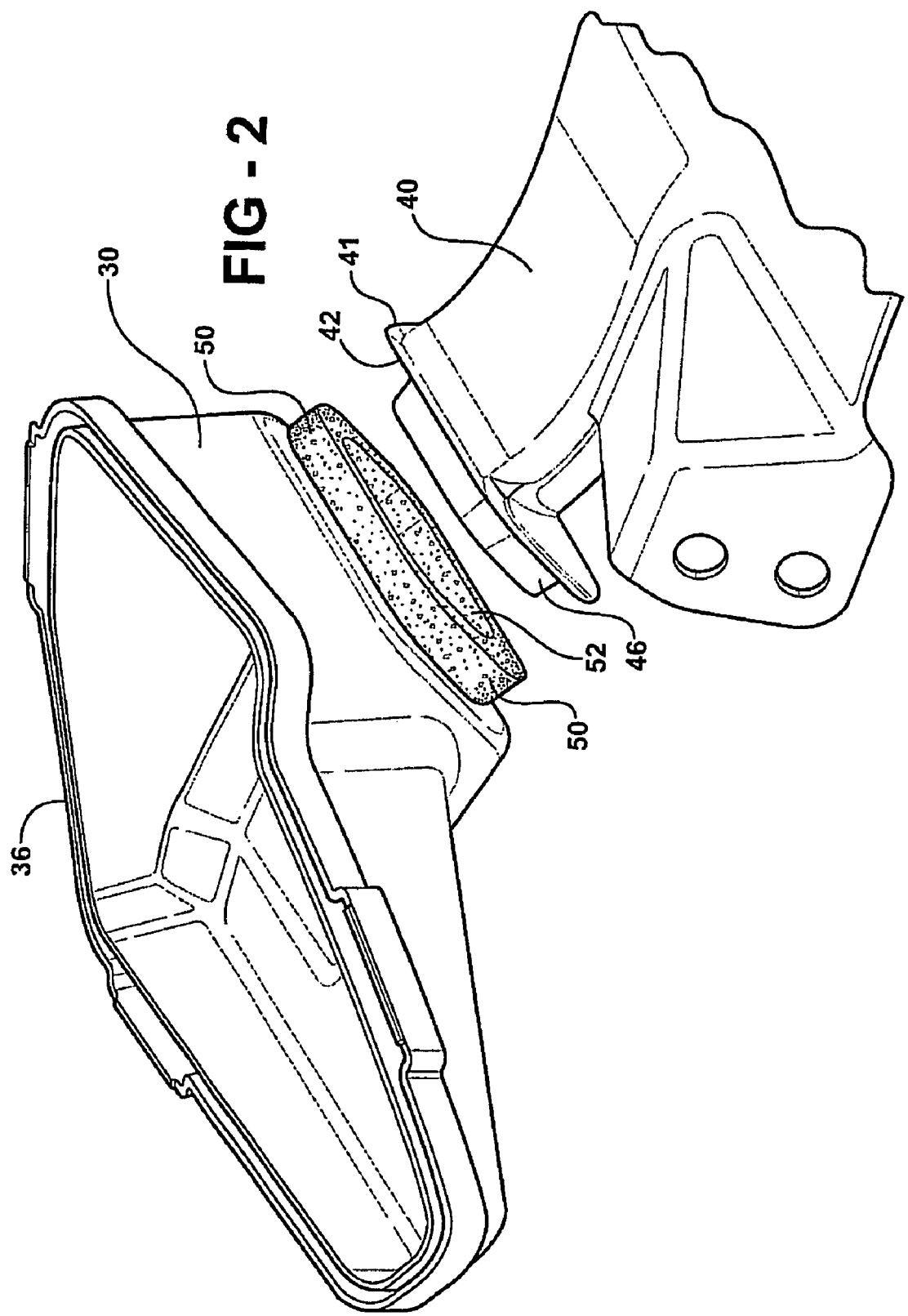

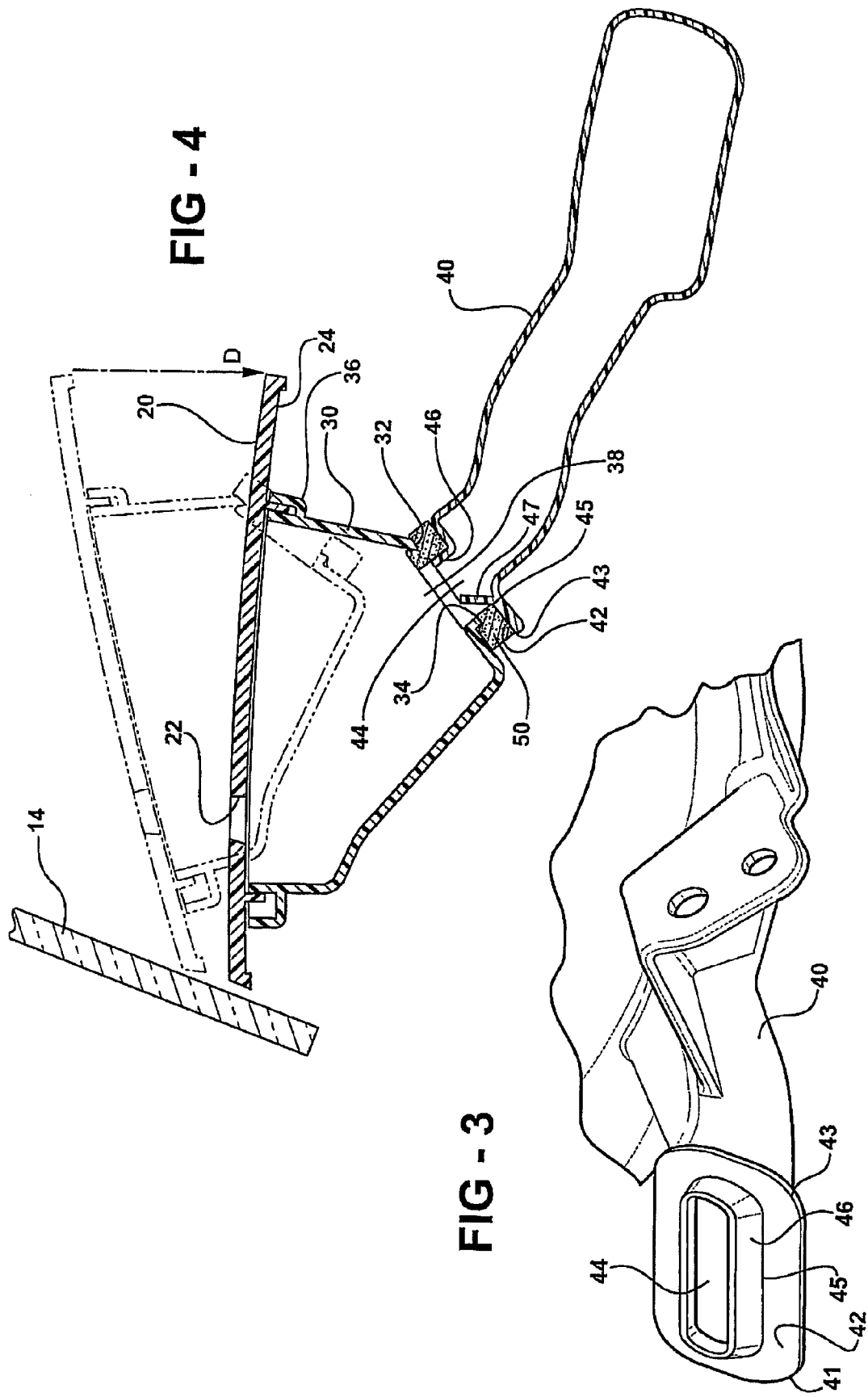

MOTOR VEHICLE INSTRUMENT PANEL ASSEMBLY HAVING A CONDUIT WITH A GASKET SUPPORT LIP

FIELD OF THE INVENTION

The invention relates to an instrument panel assembly for a motor vehicle. More particularly, the invention relates to a gasket support lip between mating ventilation conduits of the instrument panel assembly.

BACKGROUND OF THE INVENTION

Instrument panel assemblies of motor vehicles typically include a plurality of ducts or conduits that are coupled together to deliver force air to various vents located along the instrument panel assembly and/or other parts of the vehicle. Gaskets are typically used for sealing and preventing air leaks at the interface between adjacent conduits. It remains desirable to provide an instrument panel assembly with structure that prevents deformation of the gasket during assembly of the instrument panel assembly, which can potentially block or impede the flow of air through the conduits.

SUMMARY OF THE INVENTION

According to one aspect of the invention, an instrument panel assembly is provided for a motor vehicle. The instrument panel assembly includes a panel member, a first conduit, a second conduit and a gasket disposed between the first and second conduit. The panel member has a vent for directing air toward a window in the vehicle. The first conduit has a first end coupled to a bottom side of the panel member which conduit provides air to the vent. The first conduit has a second end with a peripheral wall forming an inlet. The second conduit has an outlet that provides air to the inlet of the first conduit. The second conduit has a flange that extends outwardly from the outlet and includes a support surface that supports a gasket for sealing an interface between the outlet of the second conduit and the inlet of the first conduit. The second conduit has a lip that extends outwardly from the support surface of the flange and supports the gasket to prevent deformation of the gasket during assembly of the first conduit and second conduit.

According to another aspect of the invention, an instrument panel assembly is provided for a motor vehicle. The instrument panel assembly includes a panel member having a vent for directing air toward a window in the vehicle. A first conduit has a first end coupled to a bottom side of the panel member and provides air to the vent. The first conduit has a second end with a peripheral wall forming an inlet A second conduit has an outlet that provides air to the inlet of the first conduit. The second conduit has a flange that extends outwardly from the outlet and includes a support surface for supporting a gasket for sealing an interface between the outlet of the second conduit and the inlet of the first conduit. The second conduit has a lip that extends outwardly from the support surface of the flange and supports the gasket to prevent deformation of the gasket during assembly of the first conduit and second conduit. A first portion of the lip is angled inwardly toward the outlet to facilitate location of the gasket onto the support surface during assembly of the first and second conduits.

BRIEF DESCRIPTION OF THE DRAWINGS

Advantages of the present invention will be readily appreciated as the same becomes better understood by reference to the following detailed description when considered in connection with the accompanying drawings, wherein:

FIG. 2 is an exploded view of a first conduit, second conduit and a gasket according to an embodiment of the invention;

FIG. 3 is a cross sectional view of an panel member, the first conduit, the second conduit and gasket of FIG. 2; and FIG. 4 is perspective view of the second conduit of FIG. 2.

DETAILED DESCRIPTION OF THE INVENTION

Figure 1:
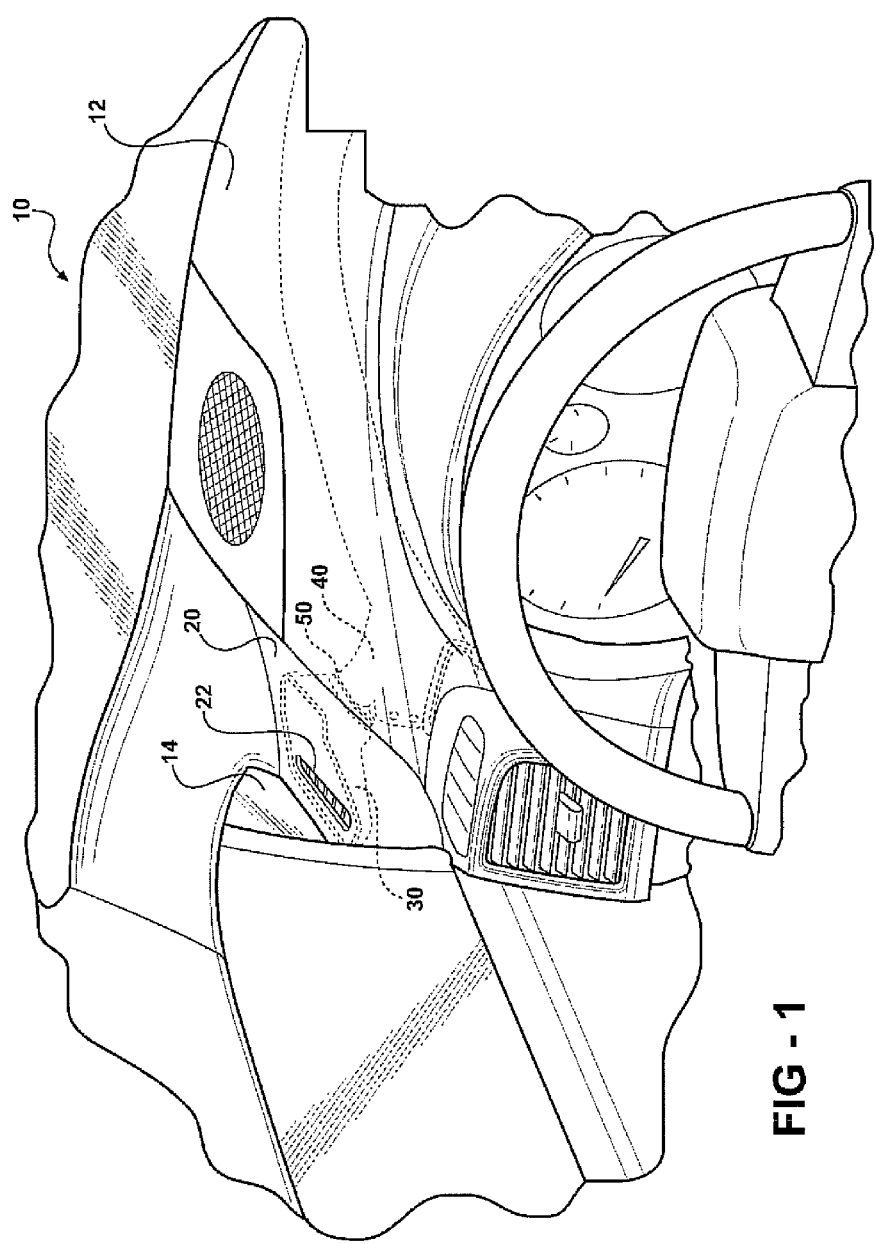
FIG. 1 is a perspective view of an instrument panel of a motor vehicle according to an embodiment of the invention, as viewed from within a passenger compartment in the vehicle.

Referring to the figures, a motor vehicle according to an embodiment of the invention is generally indicated at 10. The motor vehicle 10 includes an instrument panel 12 and a window 14. The instrument panel 12 includes an panel member 20 with a vent 22 for directing forced air toward the window 14. Forced air is provided to the vent 22 by a series of conduits including a first conduit 30 and a second conduit 40, which are described in greater detail below.

The first conduit 30 has a first end 36 coupled to a bottom side 24 of the panel member 20 and providing air to the vent 22. The first conduit 30 has a second end 32 with a peripheral wall 34 forming an inlet 38. The second conduit 40 has an outlet 44 that provides air to the inlet 38 of the first conduit 30. The second conduit 40 has a flange 41 that extends outwardly from the outlet 44 and includes a support surface 42 that supports a gasket 50 that seals the interface between the outlet 44 of the second conduit 40 and the inlet 38 of the first conduit 30. The flange 41 includes an outer edge 43 and an inner edge 45. The inner edge 45 extends peripherally along the outlet 44. The support surface 42 extends between the outer 43 and inner 45 edges of the flange 41. The support surface 42 may be planar, as shown in the illustrated embodiment.

The second conduit 40 has a lip 46 that extends outwardly from the support surface 42 of the flange 41. More specifically, the lip 46 extends outwardly from the inner edge 45 to support the gasket 50 as the gasket 50 is deformed during assembly of the first conduit 30 and the second conduit 40. In the illustrated embodiment, at least a portion of the lip 46 is generally parallel with an inner surface 52 of the gasket 50 to prevent the gasket 50 from deforming and blocking or impeding the flow of air through the inlet 38 and outlet 44 of the first 30 and second 40 conduits, respectively.

In another embodiment, the support surface 42 of the flange 41 is angled at approximately forty-five degree with respect to the panel member 20. This facilitates installation of the panel member 20 and first conduit 30 together to the instrument panel assembly 10 by ensuring a repeatable blind coupling of the first conduit 30 and second conduit 40. The lip 46 prevents the gasket 50 from being crushed or deformed to such an extent that it blocks or impedes air flow between the first 30 and second 40 conduits.

In yet another embodiment, a first portion 47 of the lip 46 is angled inwardly toward the outlet 44, such that the first portion 47 of the lip 46 is generally parallel with or tangential to a direction (indicated at D in FIG. 4) along which the first conduit 30 is assembled to the second conduit 40. This facilitates location and seating of the gasket 50 onto the support surface 42 of the flange 41 during assembly of the first 30 and second 40 conduits. This is particularly useful where the gasket 50 is provided as a sub-assembly with the panel member 20 and the first conduit 30, as indicated in FIG. 2 or as shown by the dotted lines in FIG. 4.

The invention has been described in an illustrative mailer. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. An instrument panel assembly for a motor vehicle, said instrument panel assembly comprising:
a panel member having a vent for directing air toward a window in the vehicle;
a first conduit having a first end coupled to a bottom side of the panel member and providing air to the vent, the first conduit having a second end with a peripheral wall forming an inlet; and
a second conduit having an outlet that provides air to the inlet of the first conduit, the second conduit having a flange that extends outwardly from the outlet and includes a support surface for supporting a gasket for sealing an interface between the outlet of the second conduit and the inlet of the first conduit, at least a portion of the flange extending inwardly from a second conduit peripheral wall,
the second conduit having a lip that extends outwardly from the support surface of the flange and supports the gasket to prevent deformation of the gasket during assembly of the first conduit and second conduit, the lip having a first portion being generally orthogonal to the bottom side of the panel and at an obtuse angle to the flange, and wherein the first portion of the lip protrudes into an air path defined by the first conduit and the second conduit,
wherein the peripheral wall is adapted to contact an inner surface of the gasket.

2. The instrument panel assembly as set forth in claim 1, wherein the support surface extends between inner and outer edges of the flange, the inner edge extending peripherally about the outlet.

3. The instrument panel assembly as set forth in claim 2, wherein the lip extends outwardly from the inner edge of the flange.

4. The instrument panel assembly as set forth in claim 3, wherein the lip extends peripherally along the inner edge of the flange.

5. The instrument panel assembly as set forth in claim 4, wherein the gasket extends about the lip and includes a peripherally extending inner surface generally parallel with the lip to prevent the gasket from deforming and blocking the outlet during assembly of the first conduit and the second conduit.

6. The instrument panel assembly as set forth in claim 4, wherein the lip includes a second portion that extends generally orthogonal relative to the support surface of the flange.

7. The instrument panel assembly as set forth in claim 1, wherein the instrument panel member, first conduit and gasket are pre-assembled prior to coupling the first conduit and the second conduit.

8. The instrument panel assembly as set forth in claim 7, wherein the first portion of the lip is angled inwardly toward the outlet to facilitate location of the gasket onto the support surface during assembly of the first and second conduits.

9. The instrument panel assembly as set forth in claim 8, wherein the support surface is angled at approximately forty-five degrees relative to the instrument panel member to facilitate assembly of the first and second conduits.

10. An instrument panel assembly for a motor vehicle, said instrument panel assembly comprising:
a panel member having a vent for directing air toward a window in the vehicle; a first conduit having a first end coupled to a bottom side of the panel member and providing air to the vent, the first conduit having a second end with a peripheral wall forming an inlet; and
a second conduit having an outlet that provides air to the inlet of the first conduit, the second conduit having a flange that extends outwardly from the outlet and includes a support surface for supporting a gasket for sealing an interface between the outlet of the second conduit and the inlet of the first conduit, at least a portion of the flange extending inwardly from a second conduit peripheral wall,
the second conduit having a lip that extends outwardly from the support surface of the flange and supports the gasket to prevent deformation of the gasket during assembly of the first conduit and second conduit, a first portion of the lip that extends generally orthogonal to the bottom side of the panel and at an obtuse angle to the flange, and protrudes into an air path defined by the first and second conduits to facilitate location of the gasket onto the support surface during assembly of the first and second conduits,
wherein the peripheral wall is adapted to contact an inner surface of the gasket.

11. The instrument panel assembly as set forth in claim 10, wherein a second portion of the lip is generally orthogonal relative to the support surface of the flange, the second portion of the lip being disposed along an opposite side of the outlet relative to the first portion of the lip.

12. The instrument panel assembly as set forth in claim 10, wherein the support surface is angled at approximately forty-five degrees relative to the instrument panel member to facilitate assembly of the first and second conduits.

13. The instrument panel assembly as set forth in claim 10, wherein the lip is disposed between the support surface of the flange and the outlet.

14. The instrument panel assembly as set forth in claim 10, wherein the first portion of the lip extends generally orthogonally with respect to the instrument panel member.

15. The instrument panel assembly as set in claim 10, wherein the first portion of the lip is generally parallel with or tangential with a direction along which the first conduit is assembled to the second conduit to facilitate location of the gasket onto the support surface during assembly of the first and second conduits.

* * * * *

UNITED STATES PATENT AND TRADEMARK OFFICE
CERTIFICATE OF CORRECTION

PATENT NO. : 8,109,812 B2
APPLICATION NO. : 11/957092
DATED : February 7, 2012
INVENTOR(S) : Vikram Chopra et al.

It is certified that error appears in the above-identified patent and that said Letters Patent is hereby corrected as shown below:

In the Specification:

At column 1, line number 33, delete "conduit" after which.

At column 1, line number 50, after inlet, insert --.--.

At column 2, line number 10, delete "an", insert --a--.

At column 2, line number 12, after is, insert --a--.

At column 2, line number 19, delete "an", insert --a--.

At column 3, line number 1, delete "mailer", insert --manner--.

In the Claims:

At Claim 1, column 3, line number 15, delete "wail", insert --wall--.

At Claim 10, column 4, line number 30, after flange, delete "and protrudes into an air path defined by the first and second conduits to facilitate location of the gasket onto the support surface during assembly of the first and second conduits", insert
--and wherein the first portion of the lip protrudes into an air path defined by the first conduit and the second conduit,--.

At Claim 15, column 4, line number 51, after set, insert --forth--.

Signed and Sealed this
Seventh Day of May, 2013

Teresa Stanek Rea
*Acting Director of the United States Patent and Trademark Office*